United States Patent [19]

Lehner et al.

[11] 4,328,282

[45] May 4, 1982

[54] MAGNETIC RECORDING MEDIA

[75] Inventors: August Lehner, Roedersheim-Gronau; Heinrich Hartmann, Limburgerhof; Rudolf Bachmann, Frankenthal; Werner Balz, Limburgerhof; Albert Kohl, Weisenheim, all of Fed. Rep. of Germany

[73] Assignee: BASF Aktiengesellschaft, Fed. Rep. of Germany

[21] Appl. No.: 225,677

[22] Filed: Jan. 16, 1981

[30] Foreign Application Priority Data

Feb. 11, 1980 [DE] Fed. Rep. of Germany ....... 3005009

[51] Int. Cl.$^3$ ............................................. H01F 10/02
[52] U.S. Cl. .................................. 428/425.9; 360/134; 427/128; 252/62.54; 428/423.7; 428/480; 428/692; 428/694; 428/900
[58] Field of Search .................... 428/425.9, 692, 480, 428/423.7, 900; 525/451, 440; 528/71, 75; 260/29.2 TN; 360/134, 135; 252/62.54; 427/128

[56] References Cited

U.S. PATENT DOCUMENTS

| | | | |
|---|---|---|---|
| 3,124,605 | 3/1964 | Wagner | 264/453 |
| 3,836,492 | 9/1974 | Watanabe | 260/23 TN |
| 4,066,820 | 1/1978 | Kelly | 428/483 |

FOREIGN PATENT DOCUMENTS

| | | |
|---|---|---|
| 1090196 | of 0000 | Fed. Rep. of Germany . |
| 1101394 | of 0000 | Fed. Rep. of Germany . |
| 1222067 | of 0000 | Fed. Rep. of Germany . |
| 1247026 | of 0000 | Fed. Rep. of Germany . |
| 2164386 | of 0000 | Fed. Rep. of Germany . |
| 2513421 | of 0000 | Fed. Rep. of Germany . |
| 2513422 | of 0000 | Fed. Rep. of Germany . |
| 116248 | 11/1975 | Fed. Rep. of Germany . |
| 116963 | 12/1975 | Fed. Rep. of Germany . |
| 886818 | 1/1962 | United Kingdom . |
| 1091949 | 11/1967 | United Kingdom . |
| 1125093 | 8/1968 | United Kingdom . |

*Primary Examiner*—Ellis P. Robinson
*Attorney, Agent, or Firm*—Keil & Witherspoon

[57] ABSTRACT

Magnetic recording media comprising a non-magnetic base and, applied thereto, one or more magnetizable layers based on an anisotropic magnetic material finely dispersed in an organic binder containing an ionomeric polyurethane elastomer, wherein the binder used is a substantially aqueous polyurethane dispersion prepared from a polyurethane solution which has been obtained by reacting a polyisocyanate with an organic polyhydroxy compound in the presence of an organic solvent that is inert to isocyanate groups.

3 Claims, No Drawings

MAGNETIC RECORDING MEDIA

The present invention relates to magnetic recording media comprising a non-magnetic base and one or more magnetizable layers based on an anisotropic magnetic material finely dispersed in an organic binder containing an ionomeric polyurethane elastomer.

To manufacture magnetic recording media, the coatings containing the magnetic material have hitherto been produced in the main with the aid of a highly polymeric binder or binder mixture which contains a solvent and is physically drying or chemically crosslinkable. Examples of the solvents employed are methyl ethyl ketone, methyl isobutyl ketone, ethyl acetate, butyl acetate, methanol, ethanol, propanol, butanol, toluene, xylene, tetrahydrofuran and dioxane. Disadvantages of these are that they pollute the environment, constitute a fire hazard, are toxic and are relatively expensive. For these reasons, it has for a long time been considered necessary to carry out the process in a closed system and install a recovery unit and recycle the solvent.

It has therefore already been proposed to employ aqueous polymer dispersions in the manufacture of the magnetic dispersions suitable for the manufacture of magnetic recording media. For example, German Laid-Open Applications Nos. DOS 2,513,421 and DOS 2,513,422 describe aqueous polymer dispersions based on crosslinkable vinyl acetate polymers or acrylate polymers and a melamine/formaldehyde resin. The assistants required to produce these dispersions, such as protective colloids, thickeners or emulsifiers, however cause foaming when the dispersions of the magnetic materials are produced, and give magnetic coatings having an increased tendency to smear.

East German Pat. No. 116,963 discloses magnetic recording media in which the magnetic coatings are produced with aqueous dispersions of polymer particles on which the sign of the electrical charge is different from that of the magnetic materials. This patent proposes the use of plasticized polymer dispersions in order to give fold-resistant magnetic coatings which adhere well to the base; examples of polymers used in such dispersions are plasticized polyacrylates, copolymers of vinyl acetate with unsaturated organic acids, copolymers of vinyl chloride and vinylidene chloride, copolymers of styrene and butadiene, copolymers of acrylic esters and styrene, and polyurethanes. The particle size of the polymer dispersions should not be greater, and should advantageously be less, than that of the magnetic pigments. However, magnetic recording media produced with such binders are moisture-sensitive, tend to block and smear, and have an insufficiently wear-resistant magnetic coating.

The use of crosslinked cationic polyurethanes for coating leather and textiles, and also for the production of magnetic coatings, is proposed in East German Pat. No. 116,248. These polyurethanes are produced by reaction of polyurea-urethane electrolyte dispersions (which have been produced by reaction of aromatic and/or aliphatic diisocyanates with relatively long-chain diols to give NCO-terminal prepolymers, subsequent chain extension with diols containing tertiary nitrogen, further reaction with urea and protonizing or quaternizing agents, and subsequent dispersion in water) with methylol-ether compounds. A disadvantage of this method is that crosslinking of the urea groups by means of N-methylol ethers is necessary. In particular, however, the pH-sensitivity of the binder dispersion causes difficulties. Thus it would be necessary, when dispersing the magnetic materials, which have an acid or basic surface, first to match the materials to the pH of the binder. Since even slight differences in the pH would cause the polyurethane to start to crosslink or to coagulate partially, difficulties would arise in the further processing of the magnetic dispersion, and the quality of the magnetic recording media would be impaired because the number of flaws would be increased.

It is an object of the present invention, on the basis of the known advantages of aqueous polymer dispersions, to produce magnetic recording media which do not have the above-described disadvantages, i.e. which are not moisture-sensitive, do not block, are highly abrasion-resistant, and exhibit a low number of flawks.

We have found that this object is achieved and that magnetic recording media comprising a non-magnetic base and, applied thereto, at least one magnetizable layer, based on an anisotropic magnetic material finely dispersed in an organic binder containing an ionomeric polyurethane elastomer, exhibit the said properties if the binder used is a substantially aqueous polyurethane dispersion prepared from a polyurethane solution which has been obtained by reacting a polyisocyanate with an organic polyhydroxy compound in the presence of an organic solvent that is inert to isocyanate groups—with the proviso that the salt of a mercaptocarboxylic acid is added in such an amount to the reaction product obtained by reacting a polyisocyanate with a mixture of (a) at least one acrylic or methacrylic ester diol having a molecular weight of from 146 to 3000,
(b) at least one organic polyhydroxy compound which is different from (a) and has a molecular weight of from 400 to 5000, and optionally
(c) at least one diol, diamine, aminoalcohol or triol which is different from (a) and has a molecular weight of from 62 to 400, or water, in an NCO/OH ratio of 0.85:1 to 15:1, that the adduct contains 0.5 to 10% by weight of carboxylate groups—the solution of this adduct is then converted into an aqueous dispersion by the addition of water, and the organic solvent is removed.

Advantageous binders for magnetic recording media are aqueous polyurethane dispersions which at 50° C. form films having a modulus of elasticity of from 50 to 700 N/mm$^2$ and a DIN 53,157 pendulum hardness of from 20 to 110 s, the modulus of elasticity and pendulum hardness values at room temperature being not more than 3.5 times higher. Aqueous polyurethane dispersions which have proved to be particularly advantageous are those which form films having a modulus of elasticity which is greater than 100 N/mm$^2$, in particular greater than 120 N/mm$^2$, and less than 650 N/mm$^2$, in particular less than 600 N/mm$^2$, and have a DIN 53,157 pendulum hardness which is greater than 25 s, in particular greater than 30 s, and less than 110 s, each of these properties being measured at 50° C., the modulus of elasticity and pendulum hardness values at room temperature being not more than 2.5 times higher, in particular not more than 1.6 times higher.

The salt of the mercaptocarboxylic acid, completely or partially dissolved in the organic solvent, adds to the carbon-carbon double bonds of the acrylic ester diol via thioether bridges with the incorporation of ionic groups; 10 to 100% of the carbon-carbon double bonds may be reacted with the mercaptocarboxylic acid salt.

In developing the novel process we have found that the desired properties can also be achieved with ionomeric polyurethane dispersions in which the polyurethane ionomer is combined with other, non-ionomeric, polymers, for example polyvinylidene chloride, vinyl chloride/acrylonitrile copolymers, polyvinylformal, polyurethanes free from ionic groups, and epoxy resins or with diisocyanates and/or polyisocyanates. It has proved advantageous to add the other polymer to the polyurethane ionomer (which may for example be dissolved in acetone), then to introduce the water and distil off the organic solvent. This avoids the use of a dispersant which would otherwise be necessary to produce the binder dispersion. Furthermore we have found that, surprisingly, the ionomeric polyurethane dispersions produced in this manner improve the mechanical properties, such as the modulus of elasticity and pendulum hardness, of the binder film, do not foam when the magnetic dispersion is prepared, and have a favorable effect on the wear and frictional properties of the magnetic coatings produced from the magnetic dispersion. It is advantageous to employ dispersions which consist of from 50 to 95 parts by weight of polyurethane ionomers and from 5 to 50 parts by weight of non-ionomeric polymers.

Suitable starting materials for the preparation of the polyurethane ionomers employed according to the invention are compounds which contain several reactive hydrogen atoms, are substantially linear and have a molecular weight of from 300 to 10,000, preferably from 500 to 4,000. These compounds have terminal hydroxyl, carboxyl, amino or mercapto groups; polyhydroxy compounds with terminal hydroxyl groups, such as polyesters, polyacetals, polyethers, polythioethers, nylons, epoxides and polyester-amides, are preferred. Specific examples of polyethers are the polymerization products of ethylene oxide, propylene oxide, tetrahydrofuran and butylene oxide, the copolymers and graft copolymers of these compounds, the products obtained by condensation of polyhydric alcohols or of mixtures of these, and the products obtained by oxyalkylation of polyhydric alcohols, amines, polyamines or aminoalcohols. Examples of suitable polyacetals are the compounds prepared from hexanediol and formaldehyde. Amongst polythioethers, the condensation products obtained from thiodiglycol or from a mixture thereof with other glycols or polyhydroxy compounds, are particularly suitable.

Polyhydroxy compounds which already contain urethane or urea groups, and modified or unmodified natural polyhydroxy compounds, e.g. castor oil and carbohydrates, may also be used. Of course, mixtures of different polyhydroxy compounds may be employed, in order to vary the hydrophilic or hydrophobic character and the mechanical properties of the products.

The following sould be noted with respect to the starting components of the polyurethanes used for the novel magnetic recording media:

Suitable polyisocyanates are the usual compounds known from polyurethane chemistry, particularly diisocyanates. Aromatic, aliphatic or heterocyclic diisocyanates may be used, e.g. dicyclohexylmethane diisocyanate, 1,5-naphthylene diisocyanate, 2,4- and 2,6-toluylene diisocyanate, hexamethylene diisocyanate, isophorone diisocyanate, trimethylhexamethylene diisocyanate and dicyclohexylmethane diisocyanate, preferably 4,4'-diphenylmethane diisocyanate. In a few special cases partially blocked polyisocyanates which allow the formation of self-crosslinking polyurethanes may be used; examples of these are dimeric toluylene diisocyanate or polyisocyanates which have been partially reacted with, for example, phenol, tert.-butanol, phthalimide or caprolactam.

(a) Acrylic ester diols having molecular weights of from 146 to 3000 which are suitable are reaction products of epoxy compounds with polymerizable olefinically unsaturated carboxylic acids, particularly acrylic acid and methacrylic acid, one carboxyl group being present for about every epoxide group, and reaction products of dicarboxylic acids with polymerizable olefinically unsaturated glycidyl compounds, such as those described in German Laid-Open Application No. DOS 2,164,386 for example.

Suitable unsaturated acrylic ester diols are reaction products of monoepoxides bearing OH groups, such as glycidol, with acrylic or methacrylic acid. Suitable polymerizable diols (polyols) may be obtained from, for example, epoxides having two terminal epoxide groups of the general formula

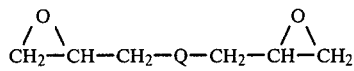

where Q is a divalent radical, for example —O—,

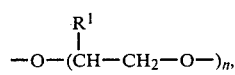

n being 1 to 10, in which $R^1$ is hydrogen or methyl, i.e. a radical derived from ethylene glycol or propylene glycol, an —O—$(CH_2)_m$—O— radical (m=1 to 7) which can be derived from polyethylene glycol or polypropylene glycol, or Q is a radical of the general formula

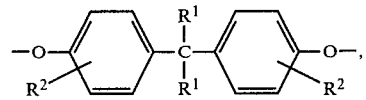

it being possible for this radical to be derived from 4,4-dihydroxydiphenylmethane bisphenol A or nuclearly substituted derivatives of this compound. The reaction products of the epoxy compounds with acrylic and/or methacrylic acid should be substantially bifunctional with respect to OH groups in the subsequent reaction with diisocyanates. If the OH functionality is higher than 3, there is a risk of crosslinking.

The reaction between the epoxy compounds and the polymerizable olefinically unsaturated acid monomers is a ring-opening esterification between the ester groups, the diepoxides and the carboxyl groups of the polymerizable acrylic or methacrylic acid, which reaction can be carried out substantially in accordance with the procedure disclosed in No. DOS 2,164,386.

The abovementioned epoxy compounds and their reaction products may be used individually or as mixtures. Preferred components (a) are reaction products of bisphenol A diglycidyl ether (e.g. ®Epikote 828 manufactured by Shell) or glycidol with acrylic or methacrylic acid.

The unsaturated polyurethanes are then produced in solution by reacting diisocyanates with the resulting acrylic or methacrylic ester diols having a molecular weight of from 146 to 3000 (a), polydihydroxy compounds having a molecular weight of from 400 to 5000 (b), and optional chain extenders (c).

(b) Suitable organic polyhydroxy compounds which are different from (a) and have a molecular weight of from 400 to 5000, preferably from 500 to 4000, are substantially linear polyesters, polycarbonates, polylactones (e.g. polycaprolactone) and polyethers. Such compounds may contain carboxyl, amino or mercapto groups in addition to terminal hydroxyl groups.

Specific examples of polyethers are the polymerization products of ethylene oxide, propylene oxide, tetrahydrofuran, butylene oxide and the copolymers or graft polymers of these compounds; the products obtained by condensing polyhydric alcohols or mixtures thereof; and the products obtained by alkoxylating polyhydric alcohols.

Suitable polyesters (b) are for example esterification products of adipic acid with $C_2$-$C_{10}$-alkanediols or oxyalkanediols. Suitable polycarbonates are for example hexanediol polycarbonates.

(c) Suitable optional diols, diamines, aminoalcohols or triols which are different from (a) and have a molecular weight of from 62 to 400, serving as chain extenders, are for example the conventional saturated or unsaturated glycols, e.g. ethylene glycol or condensates of ethylene glycol, butanediol, propane-1,2-diol, propane-1,3-diol, neopentyl glycol, dihydroxyethoxyhydroquinone, butenediol, mono- and bis-hydroxyalkylated aliphatic, cycloaliphatic, aromatic and heterocyclic amines, for example N-methylethanolamine, N-butylethanolamine, N,N-bis-α-aminopropyl-N-methylamine, N-oleylethanolamine, N-cyclohexylisopropanolamine; aliphatic, cycloaliphatic and aromatic diamines, e.g. ethylenediamine, hexamethylenediamine, 1,4-cyclohexylenediamine, benzidine, diaminodiphenylmethane, the isomers of phenylenediamine, hydrazine, aminoalcohols, e.g. ethanolamine, propanolamine and butanolamine; water may also be used as chain extender. Polyfunctional alcohols such as trimethylolpropane and glycerol should be used in less than 10 equivalent percent.

Components (a), (b) and (c) are used as a rule in a weight ratio of 100:(10 to 400):(0 to 30), preferably 100:(20 to 300):(1 to 20).

In selecting the solvent, care must be taken not to carry out the preparation of the polyurethane composition in the presence of a solvent which possesses functional groups which can interact with isocyanate groups under the reaction conditions. In the process according to the invention, it is possible to employ any solvent which does not react with the polyurethane composition and the reactants. Preferred solvents include hydrocarbons, halohydrocarbons, ketones, esters and nitriles, e.g. acetone, methyl ethyl ketone, tert.-butanol, tetrahydrofuran, acetonitrile, ethyl acetate, methylene chloride, chloroform, carbon tetrachloride, dimethylformamide and dimethylsulfoxide. Mixtues of such solvents can of course also be used. The polyurethane solution may be produced in a conventional manner, for example:

In Bulk (in a Kettle or on Belt-Type Units)

In the synthesis on belt-type units, the starting products are fed in liquid form by means of a gear pump, via an intensive mixer, onto a long belt having a heating and a cooling zone. After the polyurethane which has not yet fully reacted has left the belt, it is stored under heat and then dissolved.

Single-Stage Reaction in Solution

All reactants, in the form of 20 to 90%, preferably 30 to 70%, strength solutions, are introduced into the reactor and heated at 20° to 130° C., preferably at 30° to 90° C. The polymer is finished when the desired NCO content is reached (when isocyanate is present in excess) or when all NCO groups have reacted (when compounds containing reactive hydrogen atoms are present in excess).

Two-Stage Reaction in Solution

The polyol and diisocyanate are first reacted in part of the solution, preferably at 30° to 90° C., and then the chain is extended with a diol and, optionally, a triol. The further procedure is the same as in the single-stage reaction.

The reaction may be accelerated with polyurethane catalysts such as are known from polyurethane chemistry, e.g. organometallic compounds such as dibutyl tin dilaurate, tertiary amines and triazines.

Prior to the addition of the mercaptocarboxylic acid, the polyurethane may contain from 0.1 to 10%, preferably 0.3 to 5%, by weight of NCO groups; in another preferred embodiment the polyurethane does not contain any NCO groups.

All carboxylic acids bearing a mercapto group are suitable as mercaptocarboxylic acids for the process of the invention. Particularly suitable mercaptocarboxylic acids are those in which the mercapto group is in the α- or β-position to the acid group. The mercaptocarboxylic acids may be aliphatic or aromatic, e.g. mercaptotrimethylacetic acid, mercaptocyclohexanoic acid, mercaptophenylacetic acid, mercaptobenzoic acid, mercaptotoluic acid and mercaptochlorobenzoic acid. Also suitable are reaction products of mercaptoethanol with carboxylic anhydrides, such as succinic anhydride, maleic anhydride and phthalic anhydride, if the SH group remains free. Mercaptoacetic acid is particularly preferred.

Examples of suitable compounds for converting the mercaptocarboxylic acids into their salt forms are organic bases, such as monofunctional primary, secondary and tertiary amines, e.g. methylamine, diethylamine, trimethylamine, triethylamine, ethylamine, tributylamine, pyridine, methylethylamine, diethylmethylamine, aniline, toluidine, alkoxylated amines, such as ethanolamine, diethanolamine, triethanolamine, methyldiethanolamine, oleyldiethanolamine and polyfunctional amines in which the individual amino groups may or may not possess different basicities, e.g. N,N-dimethylethylenediamine, and compounds such as α-aminopyridine and N,N-dimethylhydrazine.

Preferred compounds are amines which boil below 120° C.; of these, tertiary amines, such as trimethylamine and triethylamine, are particularly preferred.

Inorganic compounds, e.g. ammonia, alkali metal or alkaline earth metal hydroxides, carbonates and oxides, such as sodium hydroxide and potassium hydroxide, are also suitable for converting the mercaptocarboxylic acids into their salt forms. Preferred compounds are ammonia, potassium hydroxide and sodium hydroxide. The polyurethane solution is reacted with such an amount of mercaptocarboxylic acid salt that the content of carboxylate groups in the adduct is from 0.5 to 10%, preferably from 1 to 8%, by weight.

For the addition of the SH groups the mercaptocarboxylic acid salts may be used in solid form or in solution. It is preferred to use a solution. The solvents used should not prevent the addition of the SH groups. In special cases, however, it may be advantageous for at least part of the solvent to react with any NCO groups which may still be present in the polyurethane, with chain extension or chain termination. Specific examples are halohydrocarbons, ketones, alcohols, esters, water, ethers and diol monoacrylates and monomethacrylates. Advantageously, the reactive solvents (reactive diluents) are usually only used in minor amounts. Suitable reactive diluents are the chain extenders disclosed in connection with the production of the polyurethane.

Examples of particularly suitable non-reactive solvents are acetone, methyl ethyl ketone, tetrahydrofuran, diethyl ether, tert.-butanol and toluene.

Advantageous of incorporating the ionic groups by addition of mercaptocarboxylic acid salts to double bonds of acrylates are that the reaction can be carried out at low temperatures (0° to 60° C.) and that the reaction proceeds very rapidly. For example, at 35° C. the addition is over in less than 10 minutes. The feed time may be varied within wide limits. Since the reaction is over very quickly, feed times of less than 10 minutes and even of 2 minutes are possible.

To improve the properties (e.g. to increase the thermostability and hardness), polyfunctional polyisocyanates may be added prior to the addition of water. Suitable polyfunctional polyisocyanates are described for example in German Pat. Nos. 1,090,196; 1,101,394; and 1,222,067.

Afterwards water is added and the solvent is removed, a homogeneous dispersion being obtained.

The processing of the aqueous ionomeric polyurethane dispersions with the magnetic material and with the conventional assistants into a magnetic dispersion, and the application thereof to the base material to produce magnetic recording media may be carried out in a conventional manner.

The magnetic pigments used may be conventional products, but of course the choice of pigment is a factor determining the properties of the resulting magnetic coatings. Examples of suitable magnetic pigments are gamma-iron(III) oxide, finely divided magnetite, ferromagnetic modified or unmodified chromium dioxide, cobalt-modified gamma-iron(III) oxide, and ferromagnetic metals and metal alloy pigments, e.g. pigments consisting of alloys of iron and cobalt (prepared, for example, as described in German Pat. No. 1,247,026). Preferred magnetic pigments are acicular gamma-iron(III) oxide and ferromagnetic chromium dioxide. The particle size is in general from 0.2 to 2 $\mu$m, preferably from 0.3 to 0.8 $\mu$m.

As is conventionally the case, the magnetic coatings may furthermore contain small amounts of additives such as dispersants and/or lubricants, but also fillers which are admixed when dispersing the magnetic pigments or when producing the magnetic coating. Examples of such additives are fatty acids and isomerized fatty acids, e.g. stearic acid, or salts of such acids with metals or main groups I to IV of the periodic table of the elements, amphoteric electrolytes, e.g. lecithin, fatty acid esters, waxes, silicone oils, carbon black, etc. The additives are used in conventional amounts, which are in general less than 10% by weight, based on the magnetic coating.

The weight ratio of magnetic pigment to binder or binder mixture in the recording media according to the invention is in general from 1 to 10:1 and especially from 3 to 6:1. It is particularly advantageous that, because of the excellent pigment-binding power of the polyurethane ionomers, high loadings of magnetic pigment can be achieved in the magnetic coatings without their mechanical properties being impaired and their service characteristics suffering appreciably.

The non-magnetic and non-magnetizable bases used are the conventional rigid or flexible bases, especially films of linear polyesters, e.g. polyethylene terephthalate, which are in general from 4 to 200 $\mu$m, especially from 10 to 36 $\mu$m, thick. More recently, the use of magnetic coatings on paper bases has become important for electronic computing and accounting machines; the novel coating materials may be used with advantage for this purpose, too.

The magnetic recording media may be manufactured in a conventional manner. The magnetic dispersion, prepared in dispersing apparatus, for example a steel ball mill or a stirred ball mill, from the magnetic pigment and the ionomeric polyurethane, with the addition of dispersants and other adjuvants, is advantageously filtered and applied to the non-magnetic base by means of conventional coating equipment, for example a knife coater. As a rule, orientation of the magnetic particles is effected before the fluid mix has dried on the base; drying is advantageously carried out at from 80 to 120° C. for from 2 to 5 minutes.

The magnetic coatings may be subjected to a conventional surface treatment, e.g. calendering in which the coated material is passed between polished rolls, with the application of pressure and optional heating at from 50° to 100° C., preferably from 60° to 80° C. Following this treatment, the thickness of the magnetic coating is in general from 3 to 20 $\mu$m, preferably from 4 to 10 $\mu$m. In the case of the production of flexible magnetic tapes, the coated webs are slit lengthwise to the conventional widths.

The magnetic recording media produced according to the invention have, as compared with recording media produced with conventional aqueous binders, a magnetic coating exhibiting improved homogeneity, as a result of which the number of flaws is appreciably reduced. In addition, the magnetic recording media produced according to the invention have improved wear resistance and reduced sensitivity to moisture. Furthermore, these advantages are achieved with a binder system in which the known disadvantages and hazards resulting from the use of organic solvents are avoided. Further advantages of the novel process are the reduced time required for dispersing the magnetic material in the polyurethane ionomer, and the ability to use the magnetic material in the moist state from its process of manufacture.

The Examples which follow illustrate the novel process; the Comparative Experiments serve to show the advance in the art achieved by the process of the present invention. For greater ease of comparison, the magnetic recording media are produced in the same manner, though the process can, where necessary, be varied by making conventional changes therein.

EXAMPLE 1

210 g of a polyester of adipic acid and butane-1,4-diol, having a molecular weight of 1000, 23,13 g of butane-1,4-diol, 1.34 g of trimethylolpropane, 207.2 g of Epikote 828 diacrylate, and 312.5 g of 4,4'-diphenylmethane diisocyanate are dissolved in 1760 g of tetrahydrofuran and, after the addition of 15 drops of dibutyl tin dilaurate and 20 drops of dibutyl tin octoate, the whole is stirred at 60° C. until a constant NCO content is achieved. A mixture of 55.2 g of thioglycolic acid, 60.6 g of triethylamine and 31 g of acetone is then rapidly added and, after a reaction time of 45 minutes, the reaction mixture is dispersed with water. The solvent is then removed under reduced pressure.

6,000 parts of an acicular gamma-iron(III) oxide, having a coercive force of 24.3 kA/m, are then dispersed for 10 hours in a solution of 240 parts of 30% strength ammonia and 3,900 parts of water in a steel ball mill which has a capacity of 30,000 parts by volume, is filled with 40,000 parts of balls and is run at 50 rpm. 3,750 parts of the polyurethane dispersion prepared above and 60 parts of a commercial silicone oil are then added to the batch and dispersing is continued for 30 minutes.

The resulting magnetic dispersion is filtered through a filter paper of 5 μm pore size and is then applied to a 12 μm thick polyethylene terephthalate film by means of a conventional knife coater. The coated film is passed through a uniform magnetic field to orient the gamma-iron(III) oxide particles and the coating is then dried at 80°–120° C. Thereafter, the coated film is calendered at 80° C. and a nip pressure of 23 N/mm². The magnetic coating is 5.0±0.3 μm thick. The coated film is then slit into 3.81 mm wide magnetic tapes, which are subjected to the following tests:

TEST 1

Coefficient of friction, magnetic coating/steel, before and after sustained operation (tape run for 1 hour at an ambient temperature of 23° C. and at 50% relative atmospheric humidity).

The coefficients of friction are determined by the method of DIN 45,522, Sheet 1, on virgin tape and on the tape used in the 1-hour test.

TEST 2

Friction at very low relative velocity

The coefficient of friction is determined by measuring the tensile force which is produced by the friction between a moving magnetic tape and a stationary drum. The drum is a steel drum having a surface roughness of about 0.15 μm and a diameter of 70 mm. The piece of tape is 25 cm long and is drawn, under a tension of 20 cN, over the drum at a speed of 1 mm/sec, the wrap-around angle being 180° C. The tensile force exerted on the drum, F, is a measure of the coefficient of friction μ, which is calculated using equation $$\mu = 1/\pi \times \ln F/20.$$

TEST 3

Dynamic friction

The coefficient of friction is measured by the same method as in Test 2, except that the drum revolves at a peripheral speed of 9.5 cm/sec.

TEST 4

Blocking (layer-to-layer adhesion)

Blocking of the magnetic tapes is measured by the MIL-T-21029A method, which differentiates between blocking and delamination of the coating and base.

The results of the tests are shown in the Table.

EXAMPLE 2

415 g of a polycaprolactone (OH number 135), 27 g of butane-1,4-diol and 300 g of 4,4'-diphenylmethane diisocyanate are dissolved in 1113 g of tetrahydrofuran and, after adding 10 drops of dibutyl tin dilaurate and 20 drops of dibutyl tin octoate, the mixture is heated to 60° C. and stirred until the NCO content is 1.8%.

454 g of Epikote 1001 diacrylate, dissolved in 454 g of acetone, is then added, and stirring is continued until the NCO content is 0%. A mixture of 73.6 g of an 80% strength solution of thioglycolic acid in water, 80.8 g of triethylamine and 42 g of acetone is then stirred in, and 30 minutes later 175 g of Desmodur L (product of Bayer AG, Leverkusen, Germany) is stirred in.

10 minutes after the addition of Desmodur L the mixture was dispersed with water and the solvent was removed under reduced pressure. A stable aqueous dispersion is obtained. A magnetic tape is produced therewith, as described in Example 1. The results of the measurements on the polymer film and the magnetic tape are shown in the Table.

EXAMPLE 3

The procedure of Example 2 is followed, except that 233 g of Desmodur L is used instead of 175 g thereof. A magnetic tape is produced with the resulting dispersion, as described in Example 1. The results of the measurements on the polymer film and the magnetic tape are given in the Table.

EXAMPLE 4

250 g of a polyester of adipic acid and butane-1,4-diol, having a molecular weight of 1000, 22.5 g of butane-1,4-diol, 4.47 g of trimethylolpropane, 292 g of Epikote 828 diacrylate, and 350 g of 4,4'-diphenylmethane diisocyanate are dissolved in 920 g of tetrahydrofuran and, after the addition of 10 drops of dibutyl tin dilaurate and 20 drops of dibutyl tin octoate, the whole is stirred at 60° C. until the NCO content is 1.6%. A mixture of 115 g of an 80% strength solution of thioglycolic acid in water, 101 g of triethylamine and 42 g of acetone is then added, and after 30 minutes the reaction mixture is dispersed with water. The solvent is then distilled off under reduced pressure, a stable aqueous dispersion being obtained. A magnetic tape is produced therewith, as described in Example 1. The results of the measurements on the polymer film and the magnetic tape are given in the Table.

EXAMPLE 5

250 g of a polyester of adipic acid and butane-1,4-diol, having a molecular weight of 1000, 26 g of neopentyl glycol, 4.47 g of trimethylolpropane, 272 g of Epikote 828 diacrylate, and 350 g of 4,4'-diphenylmethane diisocyanate are dissolved in 902 g of tetrahydrofuran and, after the addition of 10 drops of dibutyl tin dilaurate and 20 drops of dibutyl tin octoate, the whole is stirred at 60° C. until the NCO content is 1.6%. A mixture of 115 g of an 80% strength solution of thioglycolic acid in water, 101 g of triethylamine and 52 g of acetone is then added, and after 30 minutes the reaction mixture is dispersed with water. The solvent is then distilled off under reduced pressure, a stable aqueous dispersion being obtained. A magnetic tape is produced therewith, as described in Example 1. The results of the measurements on the polymer film and the magnetic tape are given in the Table.

EXAMPLE 6

150 g of a polyester of adipic acid and butane-1,4-diol, having a molecular weight of 1000, 81.2 g of Silikoftal HTL (product of Goldschmidt AG, Essen, Germany), 22.5 g of butane-1,4-diol, 4.47 g of trimethylolamine, 262 g of Epikote 828 diacrylate, and 350 g of 4,4'-diphenylmethane diisocyanate are dissolved in 900 g of tetrahydrofuran and, after the addition of 10 drops of dibutyl tin dilaurate and 20 drops of dibutyl tin octoate, the whole is stirred at 60° C. until the NCO content is 1.9%. A mixture of 115 g of an 80% strength solution of mercaptoacetic acid in water, 101 g of triethylamine and 52 g of acetone is then added, and after 30 minutes the reaction mixture is dispersed with water. The solvent is then removed under reduced pressure. A magnetic tape is produced with the resulting stable aqueous dispersion, as described in Example 1. The results of the measurements on the polymer film and the magnetic tape are given in the Table.

TABLE

| | Film properties | | | | Tape properties Test | | | |
|---|---|---|---|---|---|---|---|---|
| | pendulum hardness in sec. | | modulus of elasticity in N/mm$^2$ | | | | | |
| | 50° C. | 23° C. | 50° C. | 23° C. | 1 | 2 | 3 | 4 |
| Example 1 | 85 | 120 | 658 | 699 | 0.43/ 0.36 | 0.41 | 0.45 | No |
| Example 2 | 49 | 67 | 252 | 339 | 0.38/ 0.36 | 0.41 | 0.43 | " |
| Example 3 | 53 | 70 | 275 | 412 | 0.37/ 0.34 | 0.42 | 0.41 | " |
| Example 4 | 60 | 98 | 331 | 646 | 0.27/ 0.33 | 0.40 | 0.47 | " |
| Example 5 | 78 | 103 | 232 | 610 | 0.34/ 0.29 | 0.34 | 0.52 | " |
| Example 6 | 41 | 66 | 191 | 434 | 0.34/ 0.29 | 0.27 | 0.41 | " |

We claim:

1. A magnetic recording medium comprising a non-magnetic base and, applied thereto, at least one magnetizable layer, based on an anisotropic magnetic material finely dispersed in an organic binder, containing an ionomeric polyurethane elastomer, the binder used being a substantially aqueous polyurethane dispersion prepared from a polyurethane solution which has been obtained by reacting a polyisocyanate with an organic polyhydroxy compound in the presence of an organic solvent that is inert to isocyanate groups, wherein a polyisocyanate is reacted with a mixture of
   (a) at least one acrylic or methacrylic ester diol having a molecular weight of from 146 to 3000,
   (b) at least one organic polyhydroxy compound which is different from (a) and has a molecular weight of from 400 to 5000, and optionally
   (c) at least one diol, diamine, aminoalcohol or triol which is different from (a) and has a molecular weight of from 62 to 400, or water, in an NCO/OH ratio of 0.85:1 to 15:1, the salt of a mercaptocarboxylic acid is added in such an amount to the reaction product thus obtained that the adduct contains 0.5 to 10% by weight of carboxylate groups, the solution of this adduct is then converted into an aqueous dispersion by the addition of water, and the organic solvent is removed.

2. A magnetic recording medium as claimed in claim 1, wherein the aqueous polyurethane dispersion at 50° C. forms films having a modulus of elasticity of from 50 to 700 N/mm$^2$ and a DIN 53,157 pendulum hardness of from 20 to 110 s, the modulus of elasticity and pendulum hardness values at room temperature being not more than 3.5 times higher.

3. A magnetic recording medium as claimed in claim 1 or 2, wherein, the production of the aqueous polyurethane dispersion, the salt of a mercaptocarboxylic acid is added to the reaction product of polyisocyanate and organic polyhydroxy compound in such an amount that 10 to 100% of the carbon-carbon double bonds of the acrylic or methacrylic ester diol (a) are reacted with the mercaptocarboxylic acid salt.

* * * * *